United States Patent
Zhong et al.

(10) Patent No.: US 11,411,712 B2
(45) Date of Patent: Aug. 9, 2022

(54) CRITERION METHOD OF GCCS FOR THREE-NODE VCSEL NETWORKS WITH DELAY COUPLING

(71) Applicant: WUYI UNIVERSITY, Guangdong (CN)

(72) Inventors: DOngzhou Zhong, Guangdong (CN); Zhenzhen Xiao, Guangdong (CN); Guangze Yang, Guangdong (CN)

(73) Assignee: WUYI UNIVERSITY, Guangdong (CN)

( * ) Notice: Subject to any disclaimer, the term of this patent is extended or adjusted under 35 U.S.C. 154(b) by 518 days.

(21) Appl. No.: 16/439,617

(22) Filed: Jun. 12, 2019

(65) Prior Publication Data

US 2019/0296890 A1 Sep. 26, 2019

(30) Foreign Application Priority Data

Jun. 12, 2018 (CN) .......................... 201810599588.5

(51) Int. Cl.
*H04L 9/00* (2022.01)
*H01S 5/183* (2006.01)
(Continued)

(52) U.S. Cl.
CPC .......... *H04L 9/001* (2013.01); *H01S 5/18355* (2013.01); *H04L 27/001* (2013.01); *H01S 5/005* (2013.01)

(58) Field of Classification Search
CPC ... H04L 9/001; H04L 27/001; H01S 5/18355; H01S 5/005
See application file for complete search history.

(56) References Cited

U.S. PATENT DOCUMENTS

| | | | | |
|---|---|---|---|---|
| 5,532,856 A | * | 7/1996 | Li | ............................ G02B 6/43 398/135 |
| 5,778,018 A | * | 7/1998 | Yoshikawa | ......... H01S 5/18355 372/45.01 |

(Continued)

OTHER PUBLICATIONS

Zhong et al., Criterion of globally complete chaos synchronization for diverse three-node VCSEL networks with coupling delays, Applied Physics B, 2019, 125:26.

*Primary Examiner* — Hosuk Song

(57) ABSTRACT

A criterion method of GCCS (Globally Complete Chaos Synchronization) for three-node VCSEL (Vertical Cavity Surface Emitting Laser) networks with delay coupling is provided, including steps of: providing a delay-coupled VCSEL network consisting of three identical units and dynamic equations of the VCSEL network; providing assumptions of an outer-coupling matrix and a unitary matrix under the dynamic equations of the VCSEL network; in the three-node VCSEL network, determining rate equations of i-VCSEL, determining dynamic equations of a synchronization manifold, and determining a master-stability equation; calculating three maximum Lyapunov exponents; determining a stability of a synchronization state of the three-node VCSEL network, and determining whether the synchronization manifold of the VCSEL network is a chaotic waveform. Through a master-stability function, the method for determining whether the GCCS is achieved among all node lasers is provided, which solves a difficult problem of GCCS criterion for the VCSEL networks.

3 Claims, 7 Drawing Sheets

(51) Int. Cl.
*H04L 27/00* (2006.01)
*H01S 5/00* (2006.01)

(56) References Cited

U.S. PATENT DOCUMENTS

| | | | | |
|---|---|---|---|---|
| 6,594,050 B2 * | 7/2003 | Jannson | ............. | H04Q 11/0005 398/52 |
| 6,754,407 B2 * | 6/2004 | Chakravorty | ............ | G02B 6/43 385/14 |
| 6,990,350 B2 * | 1/2006 | Davis | .................... | H04W 40/06 455/452.2 |
| 9,831,637 B1 * | 11/2017 | Fontaine | ................. | H01S 5/423 |

* cited by examiner

CRITERION METHOD OF GCCS FOR THREE-NODE VCSEL NETWORKS WITH DELAY COUPLING

CROSS REFERENCE OF RELATED APPLICATION

The application claims priority under 35 U.S.C. 119(a-d) to CN 201810599588.5, filed Jun. 12, 2018.

BACKGROUND OF THE PRESENT INVENTION

Field of Invention

The present invention relates to a field of VCSEL (Vertical Cavity Surface Emitting Laser) network, and more particularly to a criterion method of GCCS (Globally Complete Chaos Synchronization) for three-node VCSEL networks with delay coupling.

Description of Related Arts

The chaotic secure communication based on the semiconductor laser (SL) has distinct advantages, such as large bandwidth, high speed, low loss and high security. In future, it will have potential applications in the all-optical chaotic communication with the ultra-wide band and high speed. In the past twenty-four years, a series of achievements have been made in the development of chaotic secure communication system based on semiconductor lasers. Its development process for the topology is given as follows: point-to-point, point-to-multipoint, multipoint-to-multipoint, and complex network. Many researchers have explored the different topologies and the chaotic synchronization schemes of the SL-based secure communication. The researches about the topologies mainly focus on the delay connections between two nodes, and that among three or four nodes, which constitute the complex network topology. The GCCS (Globally Complete Chaos Synchronization) in these topologies plays an important role in complex network secure communication. However, the currently public GCCS only occur in a deterministic topology of three nodes or four nodes; and for three-node delay-coupled laser networks, there exist thirteen topology modules. If the semiconductor laser is subjected to optical feedback, there exist sixty-nine topology modules. For different topology modules of three-node lasers with delay coupling, the stability analysis of the synchronized manifold among three identical nodes has been a special focus due to the availability of analytic framework of the MSF (Master-Stability Function).

However, using the MSF, the criterion of the GCCS becomes complex if the node SL is subject to delay coupling, owing to the case that the delay-time could enhance and even induce synchronization in different topologies. Therefore, a lot of researches focus on the criterion of the GCCS in nonlinear system or complex network with delay coupling. For example, under large delay coupling, the calculation of the MSF for the synchronization criterion is obviously simplified; and under dual coupling channels, the complex behaviors of the GCCS are explored through utilizing the MSF. However, most of the previous researches about the MSF consider the condition that: the sum of each row in the outer-coupling matrix is zero (diffusive coupling), and the inner-coupling matrix is time-invariant. The researches about the GCCS of the complex network mainly consider the edge emitting laser as the node light source. However, in the complex chaotic secure communication network system, the VCSEL (Vertical Cavity Surface Emitting Laser) should serve as the node light source. Compared with the edge emitting laser, the VCSEL has many advantages, such as low threshold current, small volume, high efficiency, single-longitudinal-mode operation, and a circular output beam. However, the VCSEL also has more complex nonlinear dynamic behaviors and the unique polarization conversion characteristics. Besides the above conditions, the diversity of the topology modules of the three-node VCSEL network makes the criterion of the GCCS more complex. Therefore, the criterion of the GCCS in the VCSEL network is a key technical problem required to be solved urgently.

SUMMARY OF THE PRESENT INVENTION

An object of the present invention is to provide a criterion method of GCCS (Globally Complete Chaos Synchronization) for three-node VCSEL (Vertical Cavity Surface Emitting Laser) networks with delay coupling by using an MSF (Master-Stability Function) under nondiffusive and uniform delay coupling, so as to solve problems existing in the prior art.

The object of the present invention is realized through technical solutions as follows.

A criterion method of GCCS for three-node VCSEL networks with delay coupling comprises steps of:

(1), providing a delay-coupled VCSEL network consisting of three identical units, wherein dynamic equations of the VCSEL network are that:

$$\overset{g}{X}_i(t) = F(X_i(t)) + \sum_{j=1}^{3} K_{ij} H(X_i(t), X_j(t-\tau)), \; i = 1, 2, 3;$$

wherein: in the equations, $X_i(t) = [X_{i1}(t), X_{i2}(t), X_{i3}(t), X_{i4}(t), X_{i5}(t), X_{i6}(t)]^T \in R^6$ represents a state variable of an $i^{th}$ node; $F: R^6 \to R^6$ represents a nonlinear vector-valued function of an isolated node; $H: R^6 \times R^6 \to R^6$ represents an inner-coupling function of the $i^{th}$ node and a $j^{th}$ node; $\tau$ is a coupling time-delay, which is assumed to be the same for all links; $K = (K_{ij})_{3-3} \in R^{3 \times 3}$ is an outer-coupling matrix which describes a coupling topology and a strength of each link in the network; $K_{ii}$ is a self-feedback strength of the $i^{th}$ node; and, $K_{ij}$ is an injection strength from the $j^{th}$ node to the $i^{th}$ node;

(2), providing two assumptions, wherein:

for a first assumption, the sum of each row in the outer-coupling matrix $K = (K_{ij})_{3 \times 3} \in R^{3 \times 3}$ is assumed to be a same constant (constant row sum for short) that:

$$\sigma = \sum_{j=1}^{3} K_{ij}, \; i = 1, 2, 3;$$

for a second assumption, it is assumed that a unitary matrix U exists, which makes $K^T = U \Lambda U^{-1}$;

the first assumption ensures an existence of an invariant synchronization manifold; and, for a given constant row sum $\sigma$, a dynamic in the synchronization manifold of the VCSEL network is that:

$$\overset{g}{S}(t) = F(S(t)) + \sigma H(S(t), S(t-\tau));$$

to a maximum Lyapunov exponent $\lambda_{max}$ is a function of $\sigma$ and $\lambda_k$, and is calculated through a master-stability equation of:

$$\overset{g}{\xi}(t) = A\xi(t) + \lambda_k DH(S(t-\tau))\xi(t-\tau),$$

in the equation, $A=DF(S(t))+\sigma DH(S(t))$; $\lambda_k$ is an eigenvalue of K, and k=1, 2, 3; DF and DH are Jacobian matrices calculated on the synchronization manifold; an MSF is able to be obtained through calculating the maximum Lyapunov exponent; the constant row sum $\sigma$ is an eigenvalue of the outer-coupling matrix K; when $\lambda_k=\sigma$, the equation of $\overset{g}{\xi}(t)=A\xi(t)+\lambda_k DH(S(t-\tau))\xi(t-\tau)$ is the master-stability equation for the synchronization manifold, and $\sigma$ is related to disturbances within the synchronization manifold; and, transversal eigenvalues refer to all eigenvalues except for the eigenvalue $\sigma$;

(3), based on a spin-flip model and the dynamic equations of the VCSEL network, obtaining rate equations for an i-VCSEL in the three-node VCSEL networks that:

$$\frac{dE^i_{x,y}(t)}{dt} = \{\kappa[N^i(t)-1]m\gamma_a\}E^i_{x,y}(t) -$$
$$\kappa n^i(t)E^i_{y,x}(t)\{\sin[\varphi^i_y(t)-\varphi^i_x(t)] \pm \alpha\cos[\varphi^i_y(t)-\varphi^i_x(t)]\} +$$
$$K_{i1}E^1_{x,y}(t-\tau)\cos[\omega\tau+\varphi^i_{x,y}(t)-\varphi^1_{x,y}(t-\tau)] +$$
$$K_{i2}E^2_{x,y}(t-\tau)\cos[\omega\tau+\varphi^i_{x,y}(t)-\varphi^2_{x,y}(t-\tau)] +$$
$$K_{i3}E^3_{x,y}(t-\tau)\cos[\omega\tau+\varphi^i_{x,y}(t)-\varphi^3_{x,y}(t-\tau)],$$

$$\frac{d\varphi^i_{x,y}(t)}{dt} = \kappa\alpha[N^i(t)-1]m\gamma_p \pm$$
$$\kappa n^i(t)\frac{E^i_{y,x}(t)}{E^i_{x,y}(t)}\{\cos[\varphi^i_y(t)-\varphi^i_x(t)]m\alpha\sin[\varphi^i_y(t)-\varphi^i_x(t)]\} -$$
$$K_{i1}\frac{E^1_{x,y}(t-\tau)}{E^i_{x,y}(t)}\sin[\omega\tau+\varphi^i_{x,y}(t)-\varphi^1_{x,y}(t-\tau)] -$$
$$K_{i2}\frac{E^2_{x,y}(t-\tau)}{E^i_{x,y}(t)}\sin[\omega\tau+\varphi^i_{x,y}(t)-\varphi^2_{x,y}(t-\tau)] -$$
$$K_{i3}\frac{E^3_{x,y}(t-\tau)}{E^i_{x,y}(t)}\sin[\omega\tau+\varphi^i_{x,y}(t)-\varphi^3_{x,y}(t-\tau)],$$

$$\frac{dN^i(t)}{dt} = \gamma_e\{\mu - N^i(t)[1+(E^i_x(t))^2+(E^i_y(t))^2] +$$
$$2n^i(t)E^i_x(t)E^i_y(t)\sin(\varphi^i_y(t)-\varphi^i_x(t))\},$$

$$\frac{dn^i(t)}{dt} = -\gamma_s n^i(t) - \gamma_e\{n^i(t)[(E^i_x(t))^2+(E^i_y(t))^2] -$$
$$2N^i(t)E^i_x(t)E^i_y(t)\sin(\varphi^i_y(t)-\varphi^i_x(t))\},$$

wherein: in the equations, a superscript i represents the i-VCSEL; subscripts x and y respectively represent an x linear polarization mode and a y linear polarization mode; E is a slowly varying real amplitude of field; $\varphi$ is a real phase of the field; N is a total carrier inversion between a conduction band and a valence band; n is a difference between carrier inversions for a spin-up radiation channel and a spin-down radiation channel; $\kappa$ is a decay rate of the field; $\alpha$ is a linewidth enhancement factor; $\gamma_e$ is a decay rate of total carrier population; $\gamma_s$ is a spin-flip rate; $\gamma_a$ and $\gamma_p$ are linear anisotropies, respectively representing dichroism and birefringence; $\mu$ is a normalized injection current; and, central angular frequencies $\omega$ of all node VCSELs are assumed to be the same;

(4), according to the equation of $\overset{g}{S}(t)=F(S(t))+\sigma H(S(t), S(t-\tau))$, obtaining dynamic equations of the synchronization manifold of the three-node VCSEL network that:

$$\frac{dE_{sx,y}(t)}{dt} = \{\kappa[N_s(t)-1]m\gamma_a\}E_{sx,y}(t) -$$
$$\kappa n_s(t)E_{sy,x}(t)\{\sin[\varphi_{sy}(t)-\varphi_{sx}(t)] \pm \alpha\cos[\varphi_{sy}(t)-\varphi_{sx}(t)]\} +$$
$$\sigma E_{sx,y}(t-\tau)\cos[\varphi_{sx,y}(t)-\varphi_{sx,y}(t-\tau)+\omega\tau],$$

$$\frac{d\varphi_{sx,y}(t)}{dt} = \{\kappa\alpha[N_s(t)-1]m\gamma_p\} \pm$$
$$\frac{\kappa n_s(t)E_{sy,x}(t)}{E_{sx,y}(t)}\{\cos[\varphi_{sy}(t)-\varphi_{sx}(t)]m\alpha\sin[\varphi_{sy}(t)-\varphi_{sx}(t)]\} -$$
$$\frac{\sigma E_{sx,y}(t-\tau)}{E_{sx,y}(t)}\sin[\varphi_{sx,y}(t)-\varphi_{sx,y}(t-\tau)+\omega\tau],$$

$$\frac{dN_s(t)}{dt} = \gamma_e\{\mu - N_s(t)[1+E^2_{sx}(t)+E^2_{sy}(t)] +$$
$$2n_s(t)E_{sx}(t)E_{sy}(t)\sin[\varphi_{sy}(t)-\varphi_{sx}(t)]\},$$

$$\frac{dn_s(t)}{dt} = -\gamma_s n_s(t) - \gamma_e\{n_s(t)[E^2_{sx}(t)+E^2_{sy}(t)] -$$
$$2N_s(t)E_{sx}(t)E_{sy}(t)\sin[\varphi_{sy}(t)-\varphi_{sx}(t)]\},$$

(5), according to the equation of $\overset{g}{\xi}(t)=A\xi(t)+\lambda_k DH(S(t-\tau))\xi(t-\tau)$, obtaining master-stability equations for the three-node VCSEL network that:

$$\frac{d\Delta E_{x,y}(t)}{dt} = [\kappa(N_s(t)-1)m\gamma_a]\Delta E_{x,y}(t) -$$
$$\kappa n_s(t)\{\sin[\varphi_{sy}(t)-\varphi_{sx}(t)] \pm \alpha\cos[\varphi_{sy}(t)-\varphi_{sx}(t)]\}\Delta E_{y,x}(t) -$$
$$\kappa n_s(t)E_{sy,x}(t)\{-\cos[\varphi_{sy}(t)-\varphi_{sx}(t)] \pm \alpha\sin[\varphi_{sy}(t)-\varphi_{sx}(t)]\}\Delta\varphi_x(t) -$$
$$\sigma E_{sx,y}(t-\tau)\sin[\varphi_{sx,y}(t)-\varphi_{sx,y}(t-\tau)+\omega\tau]\Delta\varphi_{x,y}(t) - \kappa n_s(t)E_{sy,x}(t)$$
$$\{\cos[\varphi_{sy}(t)-\varphi_{sx}(t)]m\alpha\sin[\varphi_{sy}(t)-\varphi_{sx}(t)]\}\Delta\varphi_y(t) + \kappa E_{sx,y}(t)\Delta N(t) -$$
$$\kappa E_{sy,x}(t)\{\sin[\varphi_{sy}(t)-\varphi_{sx}(t)] \pm \alpha\cos[\varphi_{sy}(t)-\varphi_{sx}(t)]\}\Delta n(t) +$$
$$\lambda_k\left\{\begin{array}{l}\cos[\varphi_{sx,y}(t)-\varphi_{sx,y}(t-\tau)+\omega\tau]\Delta E_{x,y}(t-\tau) + \\ E_{sx,y}(t-\tau)\sin[\varphi_{sx,y}(t)-\varphi_{sx,y}(t-\tau)+\omega\tau]\Delta\varphi_{x,y}(t-\tau)\end{array}\right\},$$

$$\frac{d\Delta\varphi_{x,y}(t)}{dt} = \frac{m\kappa n_s(t)E_{sy,x}(t)}{E^2_{sx,y}(t)}\{\cos[\varphi_{sy}(t)-\varphi_{sx}(t)]m\alpha\sin[\varphi_{sy}(t)-\varphi_{sx}(t)]\}$$
$$\Delta E_{x,y}(t) + \frac{\sigma E_{sx,y}(t-\tau)}{E^2_{sx,y}(t)}\sin[\varphi_{sx,y}(t)-\varphi_{sx,y}(t-\tau)+\omega\tau]\Delta E_{x,y}(t) \pm$$
$$\frac{\kappa n_s(t)}{E_{sx,y}(t)}\{\cos[\varphi_{sy}(t)-\varphi_{sx}(t)]m\alpha\sin[\varphi_{sy}(t)-\varphi_{sx}(t)]\}\Delta E_{y,x}(t) \pm$$
$$\frac{\kappa n_s(t)E_{sy,x}(t)}{E_{sx,y}(t)}\{\sin[\varphi_{sy}(t)-\varphi_{sx}(t)] \pm \alpha\cos[\varphi_{sy}(t)-\varphi_{sx}(t)]\}\Delta\varphi_x(t) -$$
$$\frac{\sigma E_{sx,y}(t-\tau)}{E_{sx,y}(t)}\cos[\varphi_{sx,y}(t)-\varphi_{sx,y}(t-\tau)+\omega\tau]\Delta\varphi_{x,y}(t) \pm$$
$$\frac{\kappa n_s(t)E_{sy,x}(t)}{E_{sx,y}(t)}\{-\sin[\varphi_{sy}(t)-\varphi_{sx}(t)]m\alpha\cos[\varphi_{sy}(t)-\varphi_{sx}(t)]\}\Delta\varphi_y(t) +$$
$$\kappa\alpha\Delta N(t) \pm \frac{\kappa E_{sy,x}(t)}{E_{sx,y}(t)}\{\cos[\varphi_{sy}(t)-\varphi_{sx}(t)]m\alpha\sin[\varphi_{sy}(t)-\varphi_{sx}(t)]\}\Delta n(t) +$$
$$\lambda_k\left\{\frac{-\sin[\varphi_{sx,y}(t)-\varphi_{sx,y}(t-\tau)+\omega\tau]}{E_{sx,y}(t)}\Delta E_{x,y}(t-\tau) +\right.$$
$$\left.\frac{E_{sx,y}(t-\tau)}{E_{sx,y}(t)}\cos[\varphi_{sx,y}(t)-\varphi_{sx,y}(t-\tau)+\omega\tau]\Delta\varphi_{x,y}(t-\tau)\right\},$$

-continued $$\frac{d\Delta N(t)}{dt} = \{-2\gamma_e N_s(t)E_{sx}(t) + 2\gamma_e n_s(t)E_{sy}(t)\sin[\varphi_{sy}(t) - \varphi_{sx}(t)]\}\Delta E_x(t) +$$

$$\gamma_e\{-2N_s(t)E_{sy}(t) + 2n_s(t)E_{sx}(t)\sin[\varphi_{sy}(t) - \varphi_{sx}(t)]\}\Delta E_y(t) -$$

$$2\gamma_e n_s(t)E_{sx}(t)E_{sy}(t)\cos[\varphi_{sy}(t) - \varphi_{sx}(t)]\Delta\varphi_x(t) +$$

$$2\gamma_e n_s(t)E_{sx}(t)E_{sy}(t)\cos[\varphi_{sy}(t) - \varphi_{sx}(t)]\Delta\varphi_y(t) -$$

$$\gamma_e[1 + E_{sx}^2(t) + E_{sy}^2(t)]\Delta N(t) + 2\gamma_e E_{sx}(t)E_{sy}(t)\sin[\varphi_{sy}(t) - \varphi_{sx}(t)]\Delta n(t),$$

$$\frac{d\Delta n(t)}{dt} = \{-2\gamma_e N_s(t)E_{sx}(t) + 2\gamma_e n_s(t)E_{sy}(t)\sin[\varphi_{sy}(t) - \varphi_{sx}(t)]\}\Delta E_x(t) +$$

$$\gamma_e\{-2N_s(t)E_{sy}(t) + 2n_s(t)E_{sx}(t)\sin[\varphi_{sy}(t) - \varphi_{sx}(t)]\}\Delta E_y(t) -$$

$$2\gamma_e N_s(t)E_{sx}(t)E_{sy}(t)\cos[\varphi_{sy}(t) - \varphi_{sx}(t)]\Delta\varphi_x(t) +$$

$$2\gamma_e N_s(t)E_{sx}(t)E_{sy}(t)\cos[\varphi_{sy}(t) - \varphi_{sx}(t)]\Delta\varphi_y(t) +$$

$$2\gamma_e E_{sx}(t)E_{sy}(t)\sin[\varphi_{sy}(t) - \varphi_{sx}(t)]\Delta N(t) - \{\gamma_s + \gamma_e[E_{sx}^2(t) + E_{sy}^2(t)]\}\Delta n(t).$$

(6), according to the equations in the steps (4) and (5), calculating three maximum Lyapunov exponents, determining a stability of a synchronization state of the three-node VCSEL network, and determining whether the synchronization manifold of the three-node VCSEL network is a chaotic waveform.

Preferably, in the step (1), when t→∞, if $x_1(t)=x_2(t)=x_3(t)=S(t)$, the VCSEL network realizes globally complete synchronization, wherein S(t) represents the synchronization manifold of the VCSEL network; when S(t) is a chaotic waveform, the VCSEL network realizes the GCCS.

Preferably, in the step (2), for a given coupling topology with the constant row sum σ, if $\lambda_{1\ max}$ and $\lambda_{2\ max}$ are respectively negative at the transversal eigenvalues $\lambda_1$ and $\lambda_2$, the synchronization state is stable; if $\lambda_{3\ max}$ is positive at $\lambda_3=\sigma$, temporal traces of the synchronization manifold is chaotic.

The present invention has following beneficial effects.

For diverse three-node VCSEL networks with uniform time-delayed coupling, through the MSF, the present invention provides the method for determining whether the GCCS is achieved among all node lasers. The MSF can be obtained through calculating the MLE (Maximum Lyapunov Exponent) from the modified master-stability equation, and the MLE is a function of the constant row sum and the eigenvalue of the outer-coupling matrix. In the network, the outer-coupling matrix has the non-zero row sum (nondiffusive coupling), and the inner-coupling function is a function of self-node and delayed connection node. When two points determined by the constant row sum and two transversal eigenvalues are in the stability region (MLE is negative), the MLE as the function of the constant row sum and the eigenvalue (related to disturbances within the synchronization manifold) is positive, so that the arbitrarily given three-node VCSEL network is able to reach the GCCS, which solves the difficult problem of GCCS criterion in the VCSEL network.

DETAILED DESCRIPTION OF THE PREFERRED EMBODIMENT

Technical solutions of the present invention are further described in detail with accompanying drawings as follows, but the protection scope of the present invention is not limited thereto.

Figure 1:
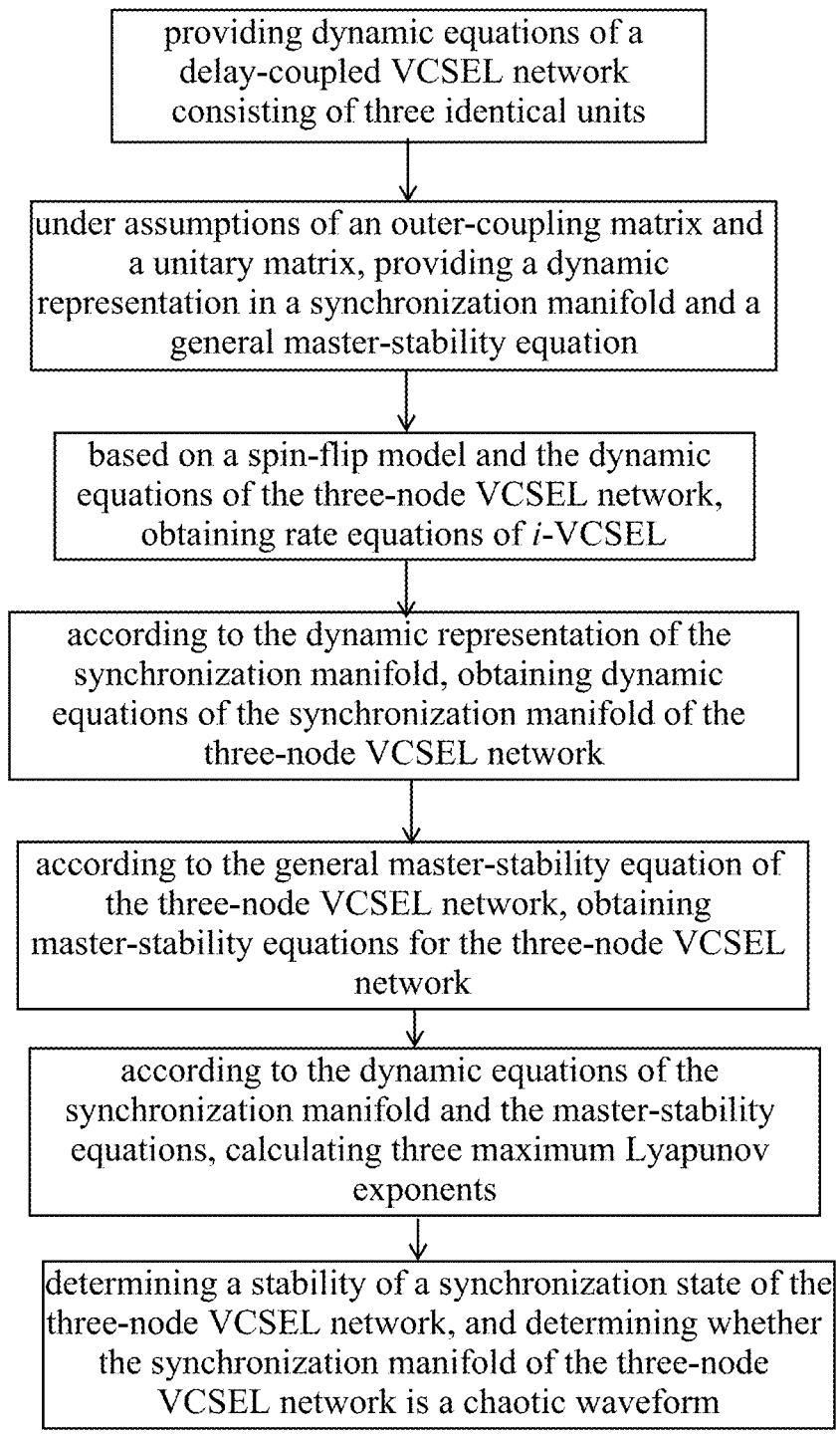
FIG. 1 is a flow chart of a criterion method of GCCS (Globally Complete Chaos Synchronization) for three-node VCSEL (Vertical Cavity Surface Emitting Laser) networks with delay coupling according to the present invention.

As shown in FIG. 1, a criterion method of GCCS (Globally Complete Chaos Synchronization) for three-node VCSEL (Vertical Cavity Surface Emitting Laser) networks with delay coupling comprises steps of:

(1), providing a delay-coupled VCSEL network consisting of three identical units, wherein dynamic equations of the VCSEL network are that:

$$\overset{g}{X}_i(t) = F(X_i(t)) + \sum_{j=1}^{3} K_{ij}H(X_i(t), X_j(t-\tau)), i = 1, 2, 3;$$

wherein: in the equations, $X_i(t)=[X_{i1}(t), X_{i2}(t), X_{i3}(t), X_{i4}(t), X_{i5}(t), X_{i6}(t)]^T \in R^6$ represents a state variable of an $i^{th}$ node; $F:R^6 \to R^6$ represents a nonlinear vector-valued function of an isolated node; $H:R^6 \times R^6 \to R^6$ represents an inner-coupling function of the $i^{th}$ node and a $j^{th}$ node; r is a coupling time-delay, which is assumed to be the same for all links; $K=(K_{ij})_{3\times 3} \in R^{3\times 3}$ is an outer-coupling matrix which describes a coupling topology and a strength of each link in the network; $K_{ii}$ is a self-feedback strength of the $i^{th}$ node; and, $K_{ij}$ is an injection strength from the $j^{th}$ node to the $i^{th}$ node;

(2), providing two assumptions, wherein:

for a first assumption, the sum of each row in the outer-coupling matrix $K=(K_{ij})_{3\times 3} \in R^{3\times 3}$ is assumed to be a same constant (constant row sum for short) that:

$$\sigma = \sum_{j=1}^{3} K_{ij}, i = 1, 2, 3;$$

for a second assumption, it is assumed that a unitary matrix U exists, which makes $K^T=U\Lambda U^{-1}$;

the first assumption ensures an existence of an invariant synchronization manifold; and, for a given constant row sum σ, a dynamic in the synchronization manifold of the VCSEL network is that:

$$\overset{g}{S}(t)=F(S(t))+\sigma H(S(t),S(t-\tau)),$$

a maximum Lyapunov exponent $\lambda_{max}$ is a function of σ and $\lambda_k$, and is calculated through a master-stability equation of:

$$\overset{g}{\xi}(t)=A\xi(t)+\lambda_k DH(S(t-\tau))\xi(t-\tau);$$

in the equation, A=DF(S(t))+σDH(S(t); $\lambda_k$ is an eigenvalue of K, and k=1, 2, 3; DF and DH are Jacobian matrices calculated on the synchronization manifold; an MSF is able to be obtained through calculating the maximum Lyapunov exponent; the constant row sum σ is an eigenvalue of the outer-coupling matrix K; when $\lambda_k$=σ, the equation of $\overset{g}{\xi}$(t) =Aξ(t)+$\lambda_k$DH(S(t−τ))ξ(t−τ) is the master-stability equation for the synchronization manifold, and σ is related to disturbances within the synchronization manifold; and, transversal eigenvalues refer to all eigenvalues except for the eigenvalue σ;

(3), based on a spin-flip model and the dynamic equations of the VCSEL network, obtaining rate equations for an i-VCSEL in the three-node VCSEL networks that:

$$\frac{dE^i_{x,y}(t)}{dt} = \{\kappa[N^i(t) - 1]m\gamma_a\}E^i_{x,y}(t) -$$
$$\kappa n^i(t)E^i_{y,x}(t)\{\sin[\varphi^i_y(t) - \varphi^i_x(t)] \pm \alpha\cos[\varphi^i_y(t) - \varphi^i_x(t)]\} +$$
$$K_{i1}E^1_{x,y}(t-\tau)\cos[\omega\tau + \varphi^i_{x,y}(t) - \varphi^1_{x,y}(t-\tau)] +$$
$$K_{i2}E^2_{x,y}(t-\tau)\cos[\omega\tau + \varphi^i_{x,y}(t) - \varphi^2_{x,y}(t-\tau)] +$$
$$K_{i3}E^3_{x,y}(t-\tau)\cos[\omega\tau + \varphi^i_{x,y}(t) - \varphi^3_{x,y}(t-\tau)],$$

$$\frac{d\varphi^i_{x,y}(t)}{dt} = \kappa\alpha[N^i(t) - 1]m\gamma_p \pm$$
$$\kappa n^i(t)\frac{E^i_{y,x}(t)}{E^i_{x,y}(t)}\{\cos[\varphi^i_y(t) - \varphi^i_x(t)]m\alpha\sin[\varphi^i_y(t) - \varphi^i_x(t)]\} -$$
$$K_{i1}\frac{E^1_{x,y}(t-\tau)}{E^i_{x,y}(t)}\sin[\omega\tau + \varphi^i_{x,y}(t) - \varphi^1_{x,y}(t-\tau)] -$$
$$K_{i2}\frac{E^2_{x,y}(t-\tau)}{E^i_{x,y}(t)}\sin[\omega\tau + \varphi^i_{x,y}(t) - \varphi^2_{x,y}(t-\tau)] -$$
$$K_{i3}\frac{E^3_{x,y}(t-\tau)}{E^i_{x,y}(t)}\sin[\omega\tau + \varphi^i_{x,y}(t) - \varphi^3_{x,y}(t-\tau)],$$

$$\frac{dN^i(t)}{dt} = \gamma_e\{\mu - N^i(t)[1 + (E^i_x(t))^2 + (E^i_y(t))^2] +$$
$$2n^i(t)E^i_x(t)E^i_y(t)\sin(\varphi^i_y(t) - \varphi^i_x(t))\},$$

$$\frac{dn^i(t)}{dt} = -\gamma_s n^i(t) - \gamma_e\{n^i(t)[(E^i_x(t))^2 + (E^i_y(t))^2] -$$
$$2N^i(t)E^i_x(t)E^i_y(t)\sin[\varphi^i_y(t) - \varphi^i_x(t)]\},$$

wherein: in the equations, a superscript i represents the i-VCSEL; subscripts x and y respectively represent an x linear polarization mode and a y linear polarization mode; E is a slowly varying real amplitude of field; φ is a real phase of the field; N is a total carrier inversion between a conduction band and a valence band; n is a difference between carrier inversions for a spin-up radiation channel and a spin-down radiation channel; κ is a decay rate of the field; α is a linewidth enhancement factor; $\gamma_e$ is a decay rate of total carrier population; $\gamma_s$ is a spin-flip rate; $\gamma_a$ and $\gamma_p$ are linear anisotropies, respectively representing dichroism and birefringence; μ is a normalized injection current; and, central angular frequencies ω of all node VCSELs are assumed to be the same;

(4), according to the equation of $\overset{g}{S}$(t)=F(S(t))+σH(S(t), S(t−τ)), obtaining dynamic equations of the synchronization manifold of the three-node VCSEL network that:

$$\frac{dE_{sx,y}(t)}{dt} = \{\kappa[N_s(t) - 1]m\gamma_a\}E_{sx,y}(t) -$$
$$\kappa n_s(t)E_{sy,x}(t)\{\sin[\varphi_{sy}(t) - \varphi_{sx}(t)] \pm \alpha\cos[\varphi_{sy}(t) - \varphi_{sx}(t)]\} +$$
$$\sigma E_{sx,y}(t-\tau)\cos[\varphi_{sx,y}(t) - \varphi_{sx,y}(t-\tau) + \omega\tau],$$

$$\frac{d\varphi_{sx,y}(t)}{dt} = \{\kappa\alpha[N_s(t) - 1]m\gamma_p\} \pm$$
$$\frac{\kappa n_s(t)E_{sy,x}(t)}{E_{sx,y}(t)}\{\cos[\varphi_{sy}(t) - \varphi_{sx}(t)]m\alpha\sin[\varphi_{sy}(t) - \varphi_{sx}(t)]\} -$$
$$\frac{\sigma E_{sx,y}(t-\tau)}{E_{sx,y}(t)}\sin[\sigma_{sx,y}(t) - \varphi_{sx,y}(t-\tau) + \omega\tau],$$

$$\frac{dN_s(t)}{dt} = \gamma_e\{\mu - N_s(t)[1 + E^2_{sx} + E^2_{sy}(t)] +$$
$$2n_s(t)E_{sx}(t)E_{sy}(t)\sin[\varphi_{sy}(t) - \varphi_{sx}(t)]\},$$

$$\frac{dn_s(t)}{dt} = -\gamma_s n_s(t) - \gamma_e\{n_s(t)[E^2_{sx}(t) + E^2_{sy}(t)] -$$
$$2N_s(t)E_{sx}(t)E_{sy}(t)\sin[\varphi_{sy}(t) - \varphi_{sx}(t)]\},$$

(5), according to the equation of $\overset{g}{\xi}$(t)=Aξ(t)−$\lambda_k$DH(S(t−τ))ξ(t−τ), obtaining master-stability equations for the three-node VCSEL network that:

$$\frac{d\Delta E_{x,y}(t)}{dt} = [\kappa(N_s(t) - 1)m\gamma_a]\Delta E_{x,y}(t) -$$
$$\kappa n_s(t)\{\sin[\varphi_{sy}(t) - \varphi_{sx}(t)] \pm \alpha\cos[\varphi_{sy}(t) - \varphi_{sx}(t)]\}\Delta E_{y,x}(t) -$$
$$\kappa n_s(t)E_{sy,x}(t)\{-\cos[\varphi_{sy}(t) - \varphi_{sx}(t)] \pm \alpha\sin[\varphi_{sy}(t) - \varphi_{sx}(t)]\}\Delta\varphi_x(t) -$$
$$\sigma E_{sx,y}(t-\tau)\sin[\varphi_{sx,y}(t) - \varphi_{sx,y}(t-\tau) + \omega\tau]\Delta\varphi_{x,y}(t) - \kappa n_s(t)E_{sy,x}(t)$$
$$\{\cos[\varphi_{sy}(t) - \varphi_{sx}(t)]m\alpha\sin[\varphi_{sy}(t) - \varphi_{sx}(t)]\}\Delta\varphi_y(t) + \kappa E_{sx,y}(t)\Delta N(t) -$$
$$\kappa E_{sy,x}(t)\{\sin[\varphi_{sy}(t) - \varphi_{sx}(t)] \pm \alpha\cos[\varphi_{sy}(t) - \varphi_{sx}(t)]\}\Delta n(t) +$$
$$\lambda_k\left\{\begin{array}{l}\cos[\varphi_{sx,y}(t) - \varphi_{sx,y}(t-\tau) + \omega\tau]\Delta E_{x,y}(t-\tau) + \\ E_{sx,y}(t-\tau)\sin[\varphi_{sx,y}(t) - \varphi_{sx,y}(t-\tau) + \omega\tau]\Delta\varphi_{x,y}(t-\tau)\end{array}\right\},$$

$$\frac{d\Delta\varphi_{x,y}(t)}{dt} = \frac{m\kappa n_s(t)E_{sy,x}(t)}{E^2_{sx,y}(t)}\{\cos[\varphi_{sy}(t) - \varphi_{sx}(t)]m\alpha\sin[\varphi_{sy}(t) - \varphi_{sx}(t)]\}$$
$$\Delta E_{x,y}(t) + \frac{\sigma E_{sx,y}(t-\tau)}{E^2_{sx,y}(t)}\sin[\varphi_{sx,y}(t) - \varphi_{sx,y}(t-\tau) + \omega\tau]\Delta E_{x,y}(t) \pm$$
$$\frac{\kappa n_s(t)}{E_{sx,y}(t)}\{\cos[\varphi_{sy}(t) - \varphi_{sx}(t)]m\alpha\sin[\varphi_{sy}(t) - \varphi_{sx}(t)]\}\Delta E_{y,x}(t) \pm$$
$$\frac{\kappa n_s(t)E_{sy,x}(t)}{E_{sx,y}(t)}\{\sin[\varphi_{sy}(t) - \varphi_{sx}(t)] \pm \alpha\cos[\varphi_{sy}(t) - \varphi_{sx}(t)]\}\Delta\varphi_x(t) -$$
$$\frac{\sigma E_{sx,y}(t-\tau)}{E_{sx,y}(t)}\cos[\varphi_{sx,y}(t) - \varphi_{sx,y}(t-\tau) + \omega\tau]\Delta\varphi_{x,y}(t) \pm$$
$$\frac{\kappa n_s(t)E_{sy,x}(t)}{E_{sx,y}(t)}\{-\sin[\varphi_{sy}(t) - \varphi_{sx}(t)]m\alpha\cos[\varphi_{sy}(t) - \varphi_{sx}(t)]\}\Delta\varphi_y(t) +$$
$$\kappa\alpha\Delta N(t) \pm \frac{\kappa E_{sy,x}(t)}{E_{sx,y}(t)}\{\cos[\varphi_{sy}(t) - \varphi_{sx}(t)]m\alpha\sin[\varphi_{sy}(t) - \varphi_{sx}(t)]\}\Delta n(t) +$$

-continued $$\lambda_k \left\{ \frac{-\sin[\varphi_{sx,y}(t) - \varphi_{sx,y}(t-\tau) + \omega\tau]}{E_{sx,y}(t)} \Delta E_{x,y}(t-\tau) + \frac{E_{sx,y}(t-\tau)}{E_{sx,y}(t)} \cos[\varphi_{sx,y}(t) - \varphi_{sx,y}(t-\tau) + \omega\tau] \Delta \varphi_{x,y}(t-\tau) \right\},$$

$$\frac{d\Delta N(t)}{dt} = \{-2\gamma_e N_s(t)E_{sx}(t) + 2\gamma_e n_s(t)E_{sy}(t)\sin[\varphi_{sy}(t) - \varphi_{sx}(t)]\}\Delta E_x(t) +$$

$$\gamma_e\{-2N_s(t)E_{sy}(t) + 2n_s(t)E_{sx}(t)\sin[\varphi_{sy}(t) - \varphi_{sx}(t)]\}\Delta E_y(t) -$$

$$2\gamma_e n_s(t)E_{sx}(t)E_{sy}(t)\cos[\varphi_{sy}(t) - \varphi_{sx}(t)]\Delta \varphi_x(t) +$$

$$2\gamma_e n_s(t)E_{sx}(t)E_{sy}(t)\cos[\varphi_{sy}(t) - \varphi_{sx}(t)]\Delta \varphi_y(t) -$$

$$\gamma_e[1 + E_{sx}^2(t) + E_{sy}^2(t)]\Delta N(t) + 2\gamma_e E_{sx}(t)E_{sy}(t)\sin[\varphi_{sy}(t) - \varphi_{sx}(t)]\Delta n(t),$$

$$\frac{d\Delta n(t)}{dt} = \{-2\gamma_e N_s(t)E_{sx}(t) + 2\gamma_e n_s(t)E_{sy}(t)\sin[\varphi_{sy}(t) - \varphi_{sx}(t)]\}\Delta E_x(t) +$$

$$\gamma_e\{-2N_s(t)E_{sy}(t) + 2n_s(t)E_{sx}(t)\sin[\varphi_{sy}(t) - \varphi_{sx}(t)]\}\Delta E_y(t) -$$

$$2\gamma_e N_s(t)E_{sx}(t)E_{sy}(t)\cos[\varphi_{sy}(t) - \varphi_{sx}(t)]\Delta \varphi_x(t) +$$

$$2\gamma_e N_s(t)E_{sx}(t)E_{sy}(t)\cos[\varphi_{sy}(t) - \varphi_{sx}(t)]\Delta \varphi_y(t) +$$

$$2\gamma_e E_{sx}(t)E_{sy}(t)\sin[\varphi_{sy}(t) - \varphi_{sx}(t)]\Delta N(t) - \{\gamma_s + \gamma_e[E_{sx}^2(t) + E_{sy}^2(t)]\}\Delta n(t).$$

(6), according to the equations in the steps (4) and (5), calculating three maximum Lyapunov exponents, determining a stability of a synchronization state of the three-node VCSEL network, and determining whether the synchronization manifold of the three-node VCSEL network is a chaotic waveform.

Furthermore, in the step (1), when $t \to \infty$, if $x_1(t)=x_2(t)=x_3(t)=S(t)$, the VCSEL network realizes globally complete synchronization, wherein $S(t)$ represents the synchronization manifold of the VCSEL network; when $S(t)$ is a chaotic waveform, the VCSEL network realizes the GCCS.

Furthermore, in the step (2), for a given coupling topology with the constant row sum $\sigma$, if $\lambda_{1\ max}$ and $\lambda_{2\ max}$ are respectively negative at the transversal eigenvalues $\lambda_1$ and $\lambda_2$, the synchronization state is stable; if $\lambda_{3\ max}$ is positive at $\lambda_3=\sigma$, temporal traces of the synchronization manifold is chaotic.

For three-node delay-coupled laser networks without the optical feedback, there exist thirteen possible topology modules, wherein: six out of the thirteen different modules are linear chains, while the other seven ones are ring structures. If the node VCSELs are subjected to an optical feedback injection, the possible module number is sixty-nine. In order to explore the GCCS properties for different topologies in the three-node VCSEL network, the MLE (Maximum Lyapunov Exponent) is required to be calculated. The MLE is a function of the constant row sum $\sigma$ and the eigenvalue $\lambda_k$, and parameter values for numerical simulation are showed as follows.

| Parameter | Symbol | Value |
| --- | --- | --- |
| Linewidth enhancement factor | $\alpha$ | 3 |
| Dichroism | $\gamma_a/\text{ns}^{-1}$ | −0.1 |
| Decay rate of carrier population | $\gamma_e/\text{ns}^{-1}$ | 1 |
| Normalized injection current | $\mu$ | 1.5 |
| Decay rate of field | $\kappa/\text{ns}^{-1}$ | 300 |
| Birefringence | $\gamma_p/\text{ns}^{-1}$ | 2 |
| Spin-flip rate | $\gamma_s/\text{ns}^{-1}$ | 50 |
| Central wavelength | $\lambda/\text{nm}$ | 850 |
| Time-delay | $\tau/\text{ns}$ | 4 |

Figure 2:
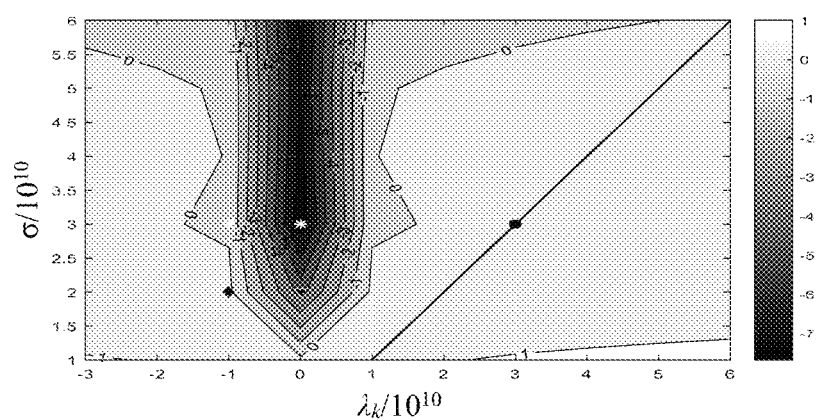
FIG. 2 is a sketch view of an MSF (Master-Stability Function) for the three-node VCSEL network in a parameter space of σ and $\lambda_k$ according to the present invention.

For simplicity, the real eigenvalue case is mainly considered herein. Specifically, the constant row sum $\sigma \in [10^{10}, 6 \times 10^{10}]$ and the eigenvalue $\lambda_k \in [-3 \times 10^{10}, 6 \times 10^{10}]$ are considered; and FIG. 2 shows the MSF for the three-node VCSEL network in a parameter space of $\sigma$ and $\lambda_k$. It can be seen from FIG. 2 that: a stability region is determined by $\lambda_{max}<0$; and, when $\lambda_k=\sigma$, the corresponding $\lambda_{max}$ is positive, indicating that all of the synchronization manifolds are chaotic waveforms.

Then, two given topology modules are respectively taken as two examples, so as to explore the validity of the MSF in FIG. 2. It should be noted that: the two fixed topologies are required to meet the first and second assumptions, and initial conditions of three VCSELs are slightly different. In order to describe the stability of the synchronization state, synchronization errors among three node-VCSELs are defined that:

$$e_{12}(t)=X_1(t)-X_2(t)=[e_{121}(t),e_{122}(t),e_{123}(t),e_{124}(t),e_{125}(t),e_{126}(t)]^T$$

$$e_{23}(t)=X_2(t)-X_3(t)=[e_{231}(t),e_{232}(t),e_{233}(t),e_{234}(t),e_{235}(t),e_{236}(t)]^T$$

$$e_{13}(t)=X_1(t)-X_3(t)=[e_{131}(t),e_{132}(t),e_{133}(t),e_{134}(t),e_{135}(t),e_{136}(t)]^T;$$

wherein: $X_i(t)$ are the state variables in the step (1); for $e_{ijq}(t)$, i and j respectively represent i-VCSEL and j-VCSEL, q is a dimension of the state variables of the node-VCSEL, and q=1, 2, 3, 4, 5, 6 respectively represent $E_x$, $E_y$, $\varphi_x$, $\varphi_y$, N and n.

Figure 3:
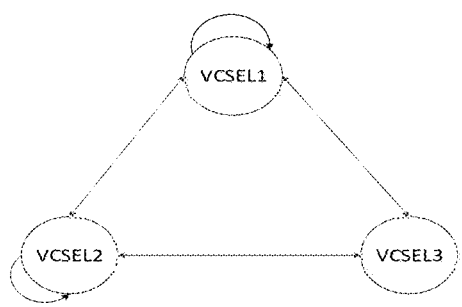
FIG. 3 is a sketch view of a ring topology based on three mutually coupled VCSELs according to the present invention.
Figure 4:
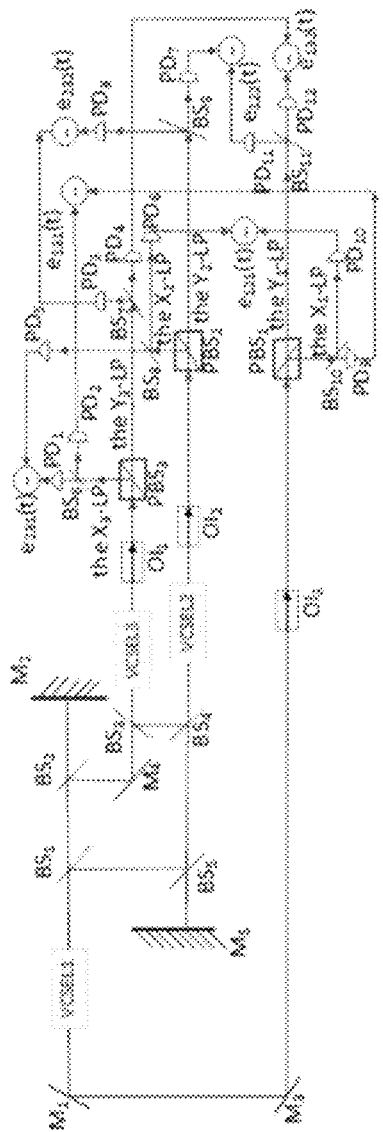
FIG. 4 is a sketch view of detailed optical paths of the ring topology based on the three mutually coupled VCSELs according to the present invention.

The ring topology with three mutually coupled node VCSELs is showed in FIG. 3. FIG. 4 shows detailed optical paths for performing the GCCS, wherein the OIs (Optical Isolators), respectively $OI_1$, $OI_2$ and $OI_3$, are for guaranteeing the unidirectional propagation of the optical wave. Mutual coupling among three node-VCSELs is realized through BSs (Beam Splitters), $BS_1$-$BS_5$. The node-VCSEL1 and the node-VCSEL2 are subjected to the optical feedback respectively through the $M_2$ (Mirror 2) and the $M_5$ (Mirror 5). When the bias current, the optical feedback strength and the injection strength are fixed to certain values, all of the node-VCSELs emit two chaotic PCs (Polarization Components). Because polarization directions thereof are along directions of an x-axis and a y-axis, the PCs are respectively defined as X-LP (X-Linear Polarization) and Y-LP (Y-Linear Polarization). For the i(j)-node VCSEL, the two PCs thereof are respectively denoted by $X_{i(j)}$-LP and $Y_{i(j)}$-LP, and decomposed by the PBS (Polarization Beam Splitter) with the number of i(j); after being converted into the electric signals by the PD (Photodetector), the temporal waveforms of the $X_i$-LP ($Y_i$-LP) and $X_j$-LP ($Y_j$-LP) may be synchronized to each other, under i≠j. The synchronization error $e_{ij1}(t)$ is able to be obtained through the synchronous subtraction between the $X_i$-LP and the $X_j$-LP. Similarly, $e_{ij2}(t)$ is able to be obtained through the synchronous subtraction between the $Y_i$-LP and the $Y_j$-LP. The outer-coupling matrix herein is set as:

$$K = \begin{bmatrix} 10^{10} & 10^{10} & 10^{10} \\ 10^{10} & 10^{10} & 10^{10} \\ 2 \times 10^{10} & 10^{10} & 0 \end{bmatrix}.$$

Figure 5:
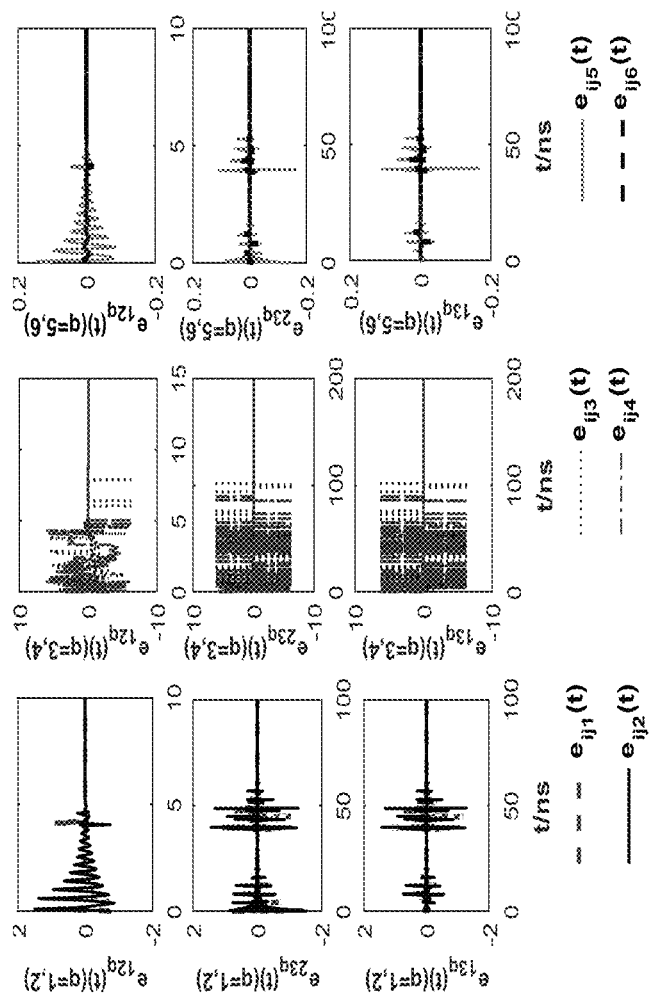
FIG. 5 is a sketch view of temporal evolutions of synchronization errors for the three-node VCSEL network according to the present invention.
Figure 6:
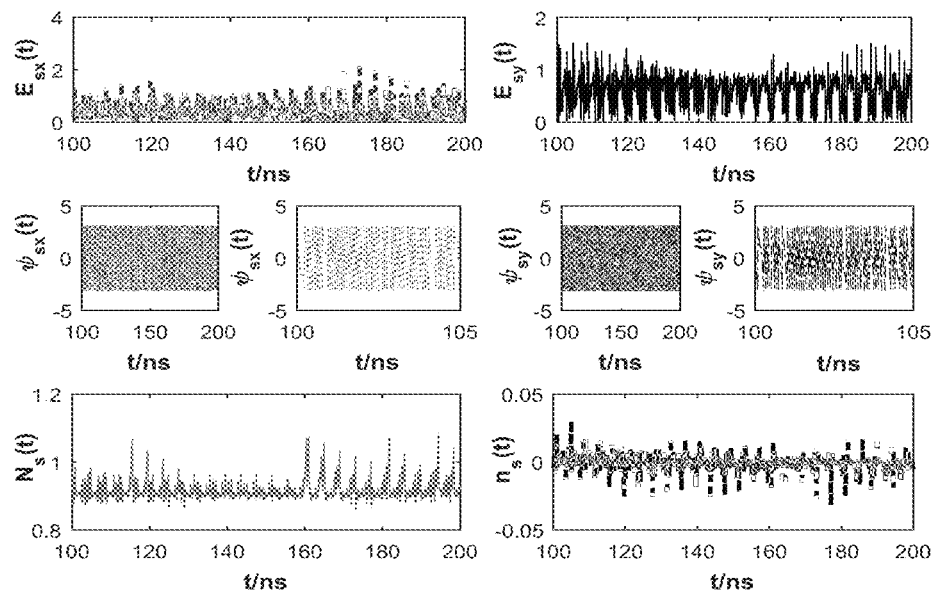
FIG. 6 is a sketch view of temporal traces of a synchronization manifold for the three-node VCSEL network according to the present invention.

A set of eigenvalues of K are that: $\lambda_1=1\times10^{10}$, $\lambda_2=-6.2867\times10^{-7}$, and $\lambda_3=\sigma=3\times10^{10}$. When $\sigma=3\times10^{10}$, it can be seen from FIG. 2 that: in the parameter space of $\sigma$ and $\lambda_k$; the points $(\sigma, \lambda_1)$ and $(\sigma, \lambda_2)$ are both in the stability region, indicating that the complete synchronization can be achieved among three node-VCSELs; $\lambda_{max}$ corresponding to the point ($\sigma$, $\lambda_3$) is positive, indicating that the synchronization manifold is a chaotic waveform. In order to verify the validity of the above results, FIG. 5 shows temporal evolutions of the synchronization errors for the three-node VCSEL network. It can be seen from FIG. 5 that: although the initial value of each VCSEL is different, all of the error curves violently oscillate at the initial stage of the evolution, then tend to zero rapidly, and finally keep at zero. All of the curves tend to zero after the transient state (about 100 ns), indicating that the globally asymptotic synchronization among three node-VCSELs can be achieved. After reaching the complete synchronization, FIG. 6 further shows the temporal traces of the synchronization manifold for the three-node VCSEL network. It can be obviously seen from FIG. 6 that: the synchronization manifold exhibits the chaotic behaviors. Therefore, the above results completely verify the GCCS criterion by the MSF displayed in FIG. 2.

Figure 7:
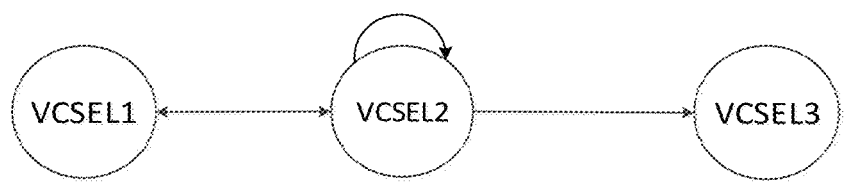
FIG. 7 is a sketch view of a topology of a bus-shaped three-node VCSEL network according to the present invention.
Figure 8:
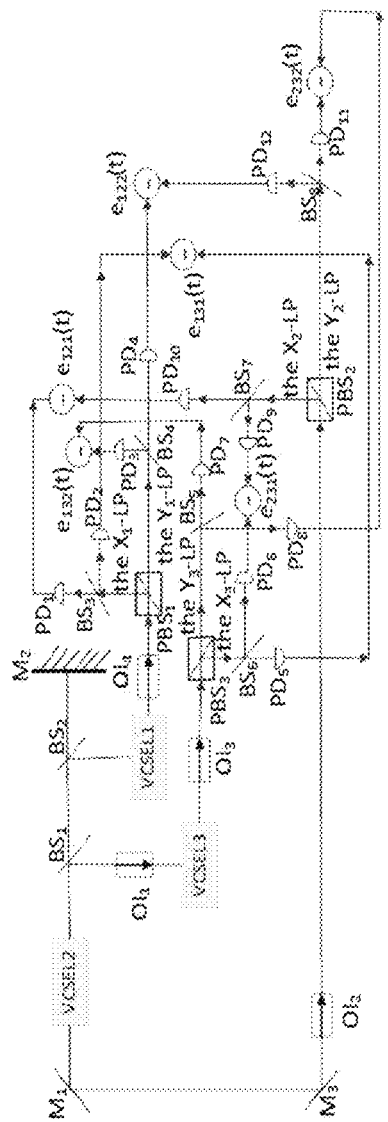
FIG. 8 is a sketch view of detailed optical paths of the bus-shaped three-node VCSEL network according to the present invention.

A bus-shaped three-node VCSEL network is taken as the other example to further verify the validity of the GCCS criterion. FIG. 7 is a sketch view of a topology of the bus-shaped three-node VCSEL network. FIG. 8 shows detailed optical paths for the bus-shaped three-node VCSEL network. In FIGS. 7 and 8, the VCSEL2 is subjected to an optical feedback through the $M_2$; the VCSEL3 is subject to the unidirectional light injection from the VCSEL2 output; mutual coupling between the VCSEL1 and the VCSEL2 is realized through the $BS_1$ and the $BS_2$; the synchronization errors $e_{ij1}(t)$ and $e_{ij2}(t)$ can be obtained through the same method in FIG. 4. For the above configuration, the outer-coupling matrix is set to be:

$$K = \begin{bmatrix} 0 & 2\times 10^{10} & 0 \\ 10^{10} & 10^{10} & 0 \\ 0 & 2\times 10^{10} & 0 \end{bmatrix}.$$

Figure 9:
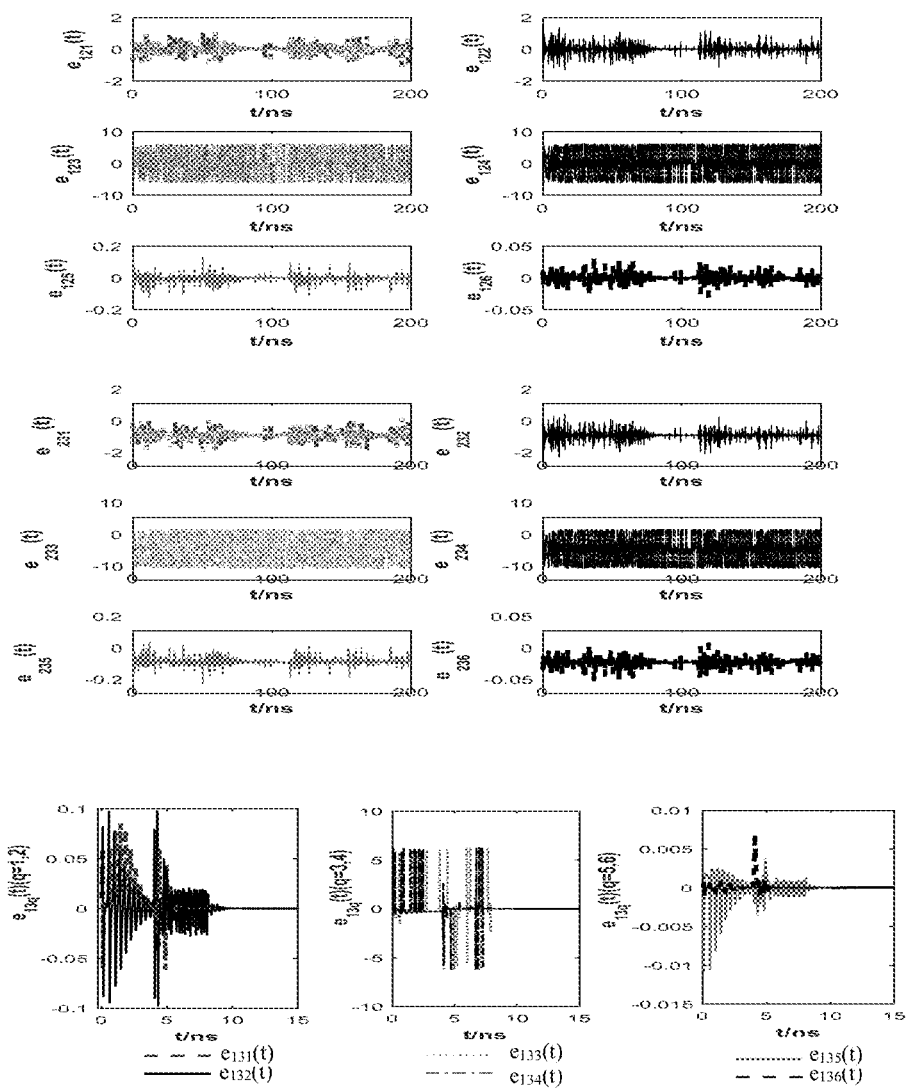
FIG. 9 is a sketch view of temporal evolutions of synchronization errors for the bus-shaped three-node VCSEL network according to the present invention.

A set of eigenvalues of K are that: $\lambda_1=-1\times 10^{10}$, $\lambda_2=0$, and $\lambda_3=\sigma=2\times 10^{10}$. When $\sigma=2\times 10^{10}$, it can be seen from FIG. 2 that: the point ($\sigma$, $\lambda_1$) is not in the stability region, and the point ($\sigma$, $\lambda_2$) is in the stability region, indicating that the topology is unable to reach the globally asymptotic synchronization. In order to further observe the synchronization properties among three-node lasers, FIG. 9 shows temporal evolutions of the synchronization errors for the bus-shaped three-node VCSEL network. It can be seen from FIG. 9 that: both of $e_{12q}(t)$ and $e_{23q}(t)$ violently oscillate during the whole evolution process, indicating that the synchronization between the VCSEL1 and the VCSEL2, as well as that between the VCSEL2 and the VCSEL3 cannot be achieved. Meanwhile, $e_{13q}(t)$ have similar temporal evolutions to those given in FIG. 5, indicating that the complete synchronization can be achieved between the VCSEL1 and the VCSEL3. From above results, it can be concluded that the global synchronization among three-node lasers are impossible to be achieved in the bus-shaped topology network. The above-mentioned results follow closely the theoretical prediction, further indicating the effectiveness of the theory.

It should be illustrated that the above-described is merely the preferred embodiment of the present invention. It should be also noted that the various improvements and modifications made by one skilled in the art without departing from the principle of the present invention are all encompassed in the protection scope of the present invention.

What is claimed is:

1. A criterion method of GCCS (Globally Complete Chaos Synchronization) for three-node VCSEL (Vertical Cavity Surface Emitting Laser) networks with delay coupling, comprising steps of:
(1), providing a delay-coupled VCSEL network consisting of three identical units, which comprises specific steps of: using multiple optical isolators in optical paths for performing the GCCS, so as to guarantee unidirectional propagation of optical wave; processing the three identical units with mutual coupling through multiple beam splitters; providing optical feedbacks to a first VCSEL node and a second VCSEL node through a first mirror and a second minor, respectively; wherein when a bias current, an optical feedback strength and an injection strength are fixed to certain values, all of the three identical units emit two chaotic polarization components; because polarization directions thereof are along directions of an x-axis and a y-axis, the chaotic polarization components are defined as x linear polarization and y linear polarization; dynamic equations of the VCSEL network are that:

$$\overset{g}{X}_i(t) = F(X_i(t)) + \sum_{j=1}^{3} K_{ij} H(X_i(t), X_j(t-\tau)), i = 1, 2, 3;$$

wherein: in the equations, $X_i(t)=[X_{i1}(t), X_{i2}(t), X_{i3}(t), X_{i4}(t), X_{i5}(t), X_{i6}(t)]^T \in R^6$ represents a state variable of an $i^{th}$ node; F: $R^6 \to R^6$ represents a nonlinear vector-valued function of an isolated node; H: $R^6 \times R^6 \to R^6$ represents an inner-coupling function of the $i^{th}$ node and a $j^{th}$ node; $\tau$ is a coupling time-delay, which is assumed to be the same for all links; $K=(K_{ij})_{3\times 3} \in R^{3\times 3}$ is an outer-coupling matrix which describes a coupling topology and a strength of each link in the network; $K_{ii}$ is a self-feedback strength of the $i^{th}$ node; and, $K_{ij}$ is an injection strength from the $j^{th}$ node to the $i^{th}$ node;

(2), providing two assumptions, wherein:
for a first assumption, the sum of each row in the outer-coupling matrix $K=(K_{ij})_{3\times 3} \in R^{3\times 3}$ is assumed to be a same constant (constant row sum for short) that:

$$\sigma = \sum_{j=1}^{3} K_{ij}, i = 1, 2, 3;$$

for a second assumption, it is assumed that a unitary matrix U exists, which makes $K^T = U\Lambda U^{-1}$;
the first assumption ensures an existence of an invariant synchronization manifold; and, for a given constant row sum $\sigma$, a dynamic in the synchronization manifold of the VCSEL network is that:

$\overset{\Omega}{S}(t)=F(S(t))+\sigma H(S(t),S(t-\tau));$ a maximum Lyapunov exponent $\lambda_{max}$ is a function of $\sigma$ and $\lambda_k$, and is calculated through a master-stability equation of:

$\overset{\Omega}{\xi}(t)=A\xi(t)+\lambda_k DH(S(t-\tau))\xi(t-\tau);$ in the equation, $A=DF(S(t))+\sigma DH(S(t))$; $\lambda_k$ is an eigenvalue of K, and k=1, 2, 3; DF and DH are Jacobian matrices calculated on the synchronization manifold; an MSF (Master-Stability Function) is able to be obtained through calculating the maximum Lyapunov exponent; the constant row sum σ is an eigenvalue of the outer-coupling matrix K; when $\lambda_k=\sigma$, the equation of $\dot{\xi}(t)=A\xi(t)+\lambda_k DH(S(t-\tau))\xi(t-\tau)$ is the master-stability equation for the synchronization manifold, and σ is related to disturbances within the synchronization manifold; and, transversal eigenvalues refer to all eigenvalues except for the eigenvalue σ;

(3), based on a spin-flip model and the dynamic equations of the VCSEL network, obtaining rate equations for an i-VCSEL in the three-node VCSEL networks that:

$$\frac{dE_{x,y}^i(t)}{dt} = \{\kappa[N^i(t)-1]m\gamma_a\}E_{x,y}^i(t) - $$
$$\kappa n^i(t)E_{y,x}^i(t)\{\sin[\varphi_y^i(t)-\varphi_x^i(t)] \pm \alpha\cos[\varphi_y^i(t)-\varphi_x^i(t)]\} +$$
$$K_{i1}E_{x,y}^1(t-\tau)\cos[\omega\tau+\varphi_{x,y}^i(t)-\varphi_{x,y}^1(t-\tau)] +$$
$$K_{i2}E_{x,y}^2(t-\tau)\cos[\omega\tau+\varphi_{x,y}^i(t)-\varphi_{x,y}^2(t-\tau)] +$$
$$K_{i3}E_{x,y}^3(t-\tau)\cos[\omega\tau+\varphi_{x,y}^i(t)-\varphi_{x,y}^3(t-\tau)],$$

$$\frac{d\varphi_{x,y}^i(t)}{dt} = \kappa\alpha[N^i(t)-1]m\gamma_p \pm$$
$$\kappa n^i(t)\frac{E_{y,x}^i(t)}{E_{x,y}^i(t)}\{\cos[\varphi_y^i(t)-\varphi_x^i(t)]m\alpha\sin[\varphi_y^i(t)-\varphi_x^i(t)]\} -$$
$$K_{i1}\frac{E_{x,y}^1(t-\tau)}{E_{x,y}^i(t)}\sin[\omega\tau+\varphi_{x,y}^i(t)-\varphi_{x,y}^1(t-\tau)] -$$
$$K_{i2}\frac{E_{x,y}^2(t-\tau)}{E_{x,y}^i(t)}\sin[\omega\tau+\varphi_{x,y}^i(t)-\varphi_{x,y}^2(t-\tau)] -$$
$$K_{i3}\frac{E_{x,y}^3(t-\tau)}{E_{x,y}^i(t)}\sin[\omega\tau+\varphi_{x,y}^i(t)-\varphi_{x,y}^3(t-\tau)],$$

$$\frac{dN^i(t)}{dt} = \gamma_e\{\mu - N^i(t)[1+(E_x^i(t))^2+(E_y^i(t))^2] +$$
$$2n^i(t)E_x^i(t)E_y^i(t)\sin(\varphi_y^i(t)-\varphi_x^i(t))\},$$

$$\frac{dn^i(t)}{dt} = -\gamma_s n^i(t) - \gamma_e\{n^i(t)[(E_x^i(t))^2+(E_y^i(t))^2] -$$
$$2N^i(t)E_x^i(t)E_y^i(t)\sin[\varphi_y^i(t)-\varphi_x^i(t)]\},$$

wherein: in the equations, a superscript i represents the i-VCSEL; subscripts x and y respectively represent an x linear polarization mode and a y linear polarization mode; E is a slowly varying real amplitude of field; φ is a real phase of the field; N is a total carrier inversion between a conduction band and a valence band; n is a difference between carrier inversions for a spin-up radiation channel and a spin-down radiation channel; κ is a decay rate of the field; α is a linewidth enhancement factor; $\gamma_e$ is a decay rate of total carrier population; $\gamma_s$ is a spin-flip rate; $\gamma_a$ and $\gamma_p$ are linear anisotropies, respectively representing dichroism and birefringence; μ is a normalized injection current; and, central angular frequencies ω of all node VCSELs are assumed to be the same;

(4), according to the equation of $\dot{S}(t)=F(S(t))+\sigma H(S(t), S(t-\tau))$, obtaining dynamic equations of the synchronization manifold of the three-node VCSEL network that:

$$\frac{dE_{sx,y}(t)}{dt} = \{\kappa[N_s(t)-1]m\gamma_a\}E_{sx,y}(t) -$$
$$\kappa n_s(t)E_{sy,x}(t)\{\sin[\varphi_{sy}(t)-\varphi_{sx}(t)] \pm \alpha\cos[\varphi_{sy}(t)-\varphi_{sx}(t)]\} +$$
$$\sigma E_{sx,y}(t-\tau)\cos[\varphi_{sx,y}(t)-\varphi_{sx,y}(t-\tau)+\omega\tau],$$

$$\frac{d\varphi_{sx,y}(t)}{dt} = \{\kappa\alpha[N_s(t)-1]m\gamma_p\} \pm$$
$$\frac{\kappa n_s(t)E_{sy,x}(t)}{E_{sx,y}(t)}\{\cos[\varphi_{sy}(t)-\varphi_{sx}(t)]m\alpha\sin[\varphi_{sy}(t)-\varphi_{sx}(t)]\} -$$
$$\frac{\sigma E_{sx,y}(t-\tau)}{E_{sx,y}(t)}\sin[\varphi_{sx,y}(t)-\varphi_{sx,y}(t-\tau)+\omega\tau],$$

$$\frac{dN_s(t)}{dt} = \gamma_e\{\mu - N_s(t)[1+E_{sx}^2(t)+E_{sy}^2(t)] +$$
$$2n_s(t)E_{sx}(t)E_{sy}(t)\sin[\varphi_{sy}(t)-\varphi_{sx}(t)]\},$$

$$\frac{dn_s(t)}{dt} = -\gamma_s n_s(t) - \gamma_e\{n_s(t)[E_{sx}^2(t)+E_{sy}^2(t)] -$$
$$2N_s(t)E_{sx}(t)E_{sy}(t)\sin[\varphi_{sy}(t)-\varphi_{sx}(t)]\},$$

(5), according to the equation of $\dot{\xi}(t)=A\xi(t)+\lambda_k DH(S(t-\tau))\xi(t-\tau)$, obtaining master-stability equations for the three-node VCSEL network that:

$$\frac{d\Delta E_{x,y}(t)}{dt} = [\kappa(N_s(t)-1)m\gamma_a]\Delta E_{x,y}(t) -$$
$$\kappa n_s(t)\{\sin[\varphi_{sy}(t)-\varphi_{sx}(t)] \pm \alpha\cos[\varphi_{sy}(t)-\varphi_{sx}(t)]\}\Delta E_{y,x}(t) -$$
$$\kappa n_s(t)E_{sy,x}(t)\{-\cos[\varphi_{sy}(t)-\varphi_{sx}(t)] \pm \alpha\sin[\varphi_{sy}(t)-\varphi_{sx}(t)]\}\Delta\varphi_x(t) -$$
$$\sigma E_{sx,y}(t-\tau)\sin[\varphi_{sx,y}(t)-\varphi_{sx,y}(t-\tau)+\omega\tau]\Delta\varphi_{x,y}(t) - \kappa n_s(t)E_{sy,x}(t)$$
$$\{\cos[\varphi_{sy}(t)-\varphi_{sx}(t)]m\alpha\sin[\varphi_{sy}(t)-\varphi_{sx}(t)]\}\Delta\varphi_y(t) + \kappa E_{sx,y}(t)\Delta N(t) -$$
$$\kappa E_{sy,x}(t)\{\sin[\varphi_{sy}(t)-\varphi_{sx}(t)] \pm \alpha\cos[\varphi_{sy}(t)-\varphi_{sx}(t)]\}\Delta n(t) +$$
$$\lambda_k\left\{\begin{array}{l}\cos[\varphi_{sx,y}(t)-\varphi_{sx,y}(t-\tau)+\omega\tau]\Delta E_{x,y}(t-\tau) + \\ E_{sx,y}(t-\tau)\sin[\varphi_{sx,y}(t)-\varphi_{sx,y}(t-\tau)+\omega\tau]\Delta\varphi_{x,y}(t-\tau)\end{array}\right\},$$

$$\frac{d\Delta\varphi_{x,y}(t)}{dt} = \frac{m\kappa n_s(t)E_{sy,x}(t)}{E_{sx,y}^2(t)}\{\cos[\varphi_{sy}(t)-\varphi_{sx}(t)]m\alpha\sin[\varphi_{sy}(t)-\varphi_{sx}(t)]\}$$
$$\Delta E_{x,y}(t) + \frac{\sigma E_{sx,y}(t-\tau)}{E_{sx,y}^2(t)}\sin[\varphi_{sx,y}(t)-\varphi_{sx,y}(t-\tau)+\omega\tau]\Delta E_{x,y}(t) \pm$$
$$\frac{\kappa n_s(t)}{E_{sx,y}(t)}\{\cos[\varphi_{sy}(t)-\varphi_{sx}(t)]m\alpha\sin[\varphi_{sy}(t)-\varphi_{sx}(t)]\}\Delta E_{y,x}(t) \pm$$
$$\frac{\kappa n_s(t)E_{sy,x}(t)}{E_{sx,y}(t)}\{\sin[\varphi_{sy}(t)-\varphi_{sx}(t)] \pm \alpha\cos[\varphi_{sy}(t)-\varphi_{sx}(t)]\}\Delta\varphi_x(t) -$$
$$\frac{\sigma E_{sx,y}(t-\tau)}{E_{sx,y}(t)}\cos[\varphi_{sx,y}(t)-\varphi_{sx,y}(t-\tau)+\omega\tau]\Delta\varphi_{x,y}(t) \pm$$
$$\frac{\kappa n_s(t)E_{sy,x}(t)}{E_{sx,y}(t)}\{-\sin[\varphi_{sy}(t)-\varphi_{sx}(t)]m\alpha\cos[\varphi_{sy}(t)-\varphi_{sx}(t)]\}\Delta\varphi_y(t) +$$
$$\kappa\alpha\Delta N(t) \pm \frac{\kappa E_{sy,x}(t)}{E_{sx,y}(t)}\{\cos[\varphi_{sy}(t)-\varphi_{sx}(t)]m\alpha\sin[\varphi_{sy}(t)-\varphi_{sx}(t)]\}\Delta n(t) +$$
$$\lambda_k\left\{\frac{-\sin[\varphi_{sx,y}(t)-\varphi_{sx,y}(t-\tau)+\omega\tau]}{E_{sx,y}(t)}\Delta E_{x,y}(t-\tau) + \right.$$
$$\left.\frac{E_{sx,y}(t-\tau)}{E_{sx,y}(t)}\cos[\varphi_{sx,y}(t)-\varphi_{sx,y}(t-\tau)+\omega\tau]\Delta\varphi_{x,y}(t-\tau)\right\},$$

$$\frac{d\Delta N(t)}{dt} = \{-2\gamma_e N_s(t)E_{sx}(t)+2\gamma_e n_s(t)E_{sy}(t)\sin[\varphi_{sy}(t)-\varphi_{sx}(t)]\}\Delta E_x(t) +$$
$$\gamma_e\{-2N_s(t)E_{sy}(t)+2n_s(t)E_{sx}(t)\sin[\varphi_{sy}(t)-\varphi_{sx}(t)]\}\Delta E_y(t) -$$
$$2\gamma_e n_s(t)E_{sx}(t)E_{sy}(t)\cos[\varphi_{sy}(t)-\varphi_{sx}(t)]\Delta\varphi_x(t) +$$

-continued $$2\gamma_e n_s(t)E_{sx}(t)E_{sy}(t)\cos[\varphi_{sy}(t)-\varphi_{sx}(t)]\Delta\varphi_y(t) -$$
$$\gamma_e[1+E_{sx}^2(t)+E_{sy}^2(t)]\Delta N(t)+2\gamma_e E_{sx}(t)E_{sy}(t)\sin[\varphi_{sy}(t)-\varphi_{sx}(t)]\Delta n(t),$$
$$\frac{d\Delta n(t)}{dt} = \{-2\gamma_e N_s(t)E_{sx}(t)+2\gamma_e n_s(t)E_{sy}(t)\sin[\varphi_{sy}(t)-\varphi_{sx}(t)]\}\Delta E_x(t) +$$
$$\gamma_e\{-2N_s(t)E_{sy}(t)+2n_s(t)E_{sx}(t)\sin[\varphi_{sy}(t)-\varphi_{sx}(t)]\}\Delta E_y(t) -$$
$$2\gamma_e N_s(t)E_{sx}(t)E_{sy}(t)\cos[\varphi_{sy}(t)-\varphi_{sx}(t)]\Delta\varphi_x(t) +$$
$$2\gamma_e N_s(t)E_{sx}(t)E_{sy}(t)\cos[\varphi_{sy}(t)-\varphi_{sx}(t)]\Delta\varphi_y(t) +$$
$$2\gamma_e E_{sx}(t)E_{sy}(t)\sin[\varphi_{sy}(t)-\varphi_{sx}(t)]\Delta N(t)-\{\gamma_s+\gamma_e[E_{sx}^2(t)+E_{sy}^2(t)]\}\Delta n(t).$$

(6), according to the equations in the steps (4) and (5), calculating three maximum Lyapunov exponents, determining a stability of a synchronization state of the three-node VCSEL network, and determining whether the synchronization manifold of the three-node VCSEL network is a chaotic waveform.

2. The criterion method of the GCCS for the three-node VCSEL networks with the delay coupling, as recited in claim 1, wherein: in the step (1), when $t\to\infty$, if $x_1(t)=x_2(t)=x_3(t)=S(t)$, the VCSEL network realizes globally complete synchronization, wherein S(t) represents the synchronization manifold of the VCSEL network; when S(t) is a chaotic waveform, the VCSEL network realizes the GCCS.

3. The criterion method of the GCCS for the three-node VCSEL networks with the delay coupling, as recited in claim 1, wherein: in the step (2), for a given coupling topology with the constant row sum σ, if $\lambda_{1\ max}$ and $\lambda_{2\ max}$ are respectively negative at the transversal eigenvalues $\lambda_1$ and $\lambda_2$ the synchronization state is stable; if $\lambda_{3\ max}$ is positive at $\lambda_3=\sigma$, temporal traces of the synchronization manifold is chaotic.

* * * * *